United States Patent [19]

Scott

[11] 4,044,968
[45] Aug. 30, 1977

[54] DOWNRIGGER FOR TROLLING

[76] Inventor: Blayney J. Scott, 306 Dallas Road, Victoria, British Columbia, Canada, V8V 1A7

[21] Appl. No.: 667,257

[22] Filed: Mar. 16, 1976

[51] Int. Cl.² .............................................. A01K 89/02
[52] U.S. Cl. .................................... 242/106; 43/27.4; 188/72.8; 188/82.34; 242/84.1 M; 242/84.5 R
[58] Field of Search .................. 242/106, 99, 84.53, 242/84.5 R, 84.51 R, 84.1 M; 254/154, 151, 186 HC, 187 G; 188/82.34, 82.9, 72.7, 72.8; 43/4, 27.4

[56] References Cited

U.S. PATENT DOCUMENTS

| | | | |
|---|---|---|---|
| 923,559 | 6/1909 | Moser | 242/99 |
| 3,392,806 | 7/1968 | Knapp | 188/72.8 X |
| 3,719,331 | 3/1973 | Harsch | 242/106 |
| 3,785,079 | 1/1974 | Rohn | 242/106 |

*Primary Examiner*—Billy S. Taylor
*Attorney, Agent, or Firm*—Carver and Company

[57] ABSTRACT

Downrigger for trolling having a reel mounted for rotation for winding a line thereonto, and unwinding line therefrom. Downrigger has brake means which permits control of rotation of the reel with one hand only to leave the other hand free for trolling rod. The brake means brakes the reel against rotation when engaged and permits free wheeling of the reel when disengaged. A cam means cooperates with the reel and has a cam surface and a cam follower cooperating with each other so that a particular relative movement between the cam surface and the cam follower actuates the cam means to engage the brake means. Brake means can be cocked so that rotation of the reel in a direction to unwind the line actuates cam means which then engages the brake means to prevent accidental unwinding, but still permits winding in of the line when required.

13 Claims, 6 Drawing Figures

DOWNRIGGER FOR TROLLING

BACKGROUND OF THE INVENTION

1. Field of the Invention

The invention relates to a downrigger as used in control depth fishing in which a trolling lure is maintained at a particular depth.

2. Prior Art

It is well known that a particular species of fish is to be found in water of a particular temperature, and that commonly water stratifies into layers of different temperatures. Also a particular species of game fish will seek the particular depth of water in which the food of that game fish, commonly a smaller fish, is to be found. Therefore if a lure is trolled at a particular depth it is likely that a particular species of fish will be caught. To maintain the trolling lure at a selected depth, two lines and associated reels are used, namely a control line carrying a heavy weight which is used to control depth and a common trolling line which carries the lure. The trolling line is releasably clipped to the control line and the lure trails behind the clip at a depth determined by the depth of the weight, variations in trolling speed having little effect on the depth of the weight. The weight is maintained at a particular depth dependent on the desired species and conditions that may cause such fish to seek that depth, and when there is a strike the trolling line is released from the control line and the fish is played in the normal manner. It is preferable to wind in the control line when there has been a bite to avoid fouling of the control line with the trolling line.

The control line is commonly wound on a downrigger which requires a depth indicator and a brake means to prevent the line unwinding. Common downriggers have a reel having openings therein, and to prevent the reel unwinding, the reel is first stopped with one hand at a particular location and a releasable peg, restricted against tangential movement, is inserted in an opening in the reel by the other hand. The peg is thus a brake but this has the disadvantage that two hands are required to brake the reel when winding in the weight. Furthermore, if the handle of the reel is accidentally released whilst winding in, the weight drops rapidly and rapidly unwinds the control line. If this happens it is essentially impossible to reinsert the peg unless the reel is stopped first, which can be dangerous, and thus commonly the weight will rapidly unwind until it hits bottom or the line is completely unwound. If a rapidly unwinding reel is stopped suddenly, shock forces may break the line thus loosing the weight and portions of the line. It can be appreciated that, immediately following a strike, the fisherman is occupied by playing the fish on the trolling line, but, to avoid the lines fouling he wants to wind in the control line. Because winding in the control line and operating the peg requires two hands for proper operation, when fishing alone the present method of braking the downrigger reel is clearly unsatisfactory.

SUMMARY OF THE INVENTION

The present invention reduces difficulties of the prior art by providing a downrigger which has a brake to brake the reel smoothly and under control, and which can be engaged or disengaged with one hand because the reel does not require stopping before engaging the brake. Furthermore, the brake can be cocked so as to permit the line to be wound and simultaneously to prevent the line unwinding when the hand is released from the reel.

A downrigger for trolling according to the invention has a reel mounted for rotation and adapted for winding a line thereon and for unwinding a line therefrom. The downrigger has a brake means adapted to brake the reel against rotation when engaged, and to permit free-wheeling of the reel when disengaged. A cam means cooperates with the reel and has a cam surface and a cam follower cooperating with each other so that a particular relative movement between the cam surface and the cam follower actuates the cam means to engage the brake means to brake the reel against rotation. Also the cam means can be cocked so that rotation of the reel in a particular direction to unwind the line actuates the cam means, which then engages the brake means to brake the reel against rotation in that particular direction, whilst permitting rotation in an opposite direction to wind in the line.

A detailed disclosure following, related to drawings, describes a preferred embodiment of the invention, which is capable of expression in structure other than that particularly described and illustrated.

DETAILED DISCLOSURE

Figure 1:
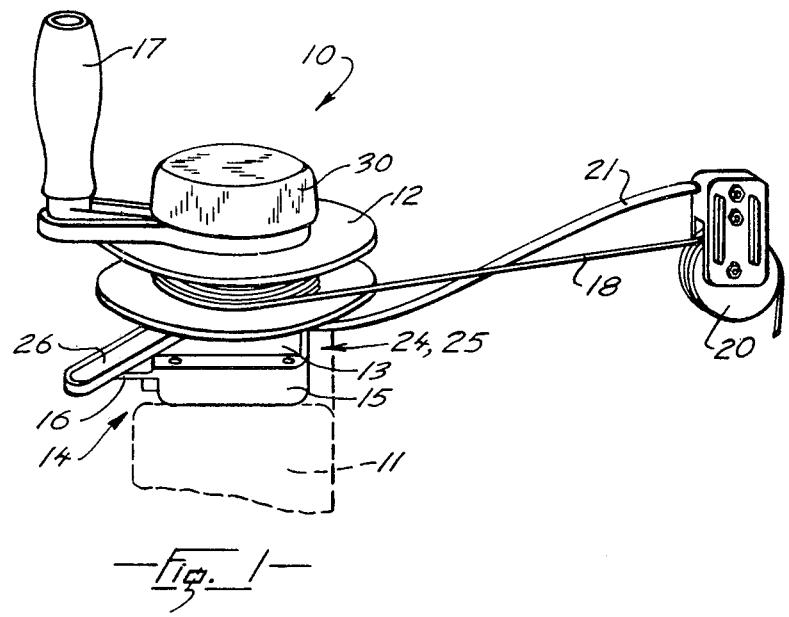
FIG. 1 is a simplified perspective of a downrigger according to the invention.
Figure 2:
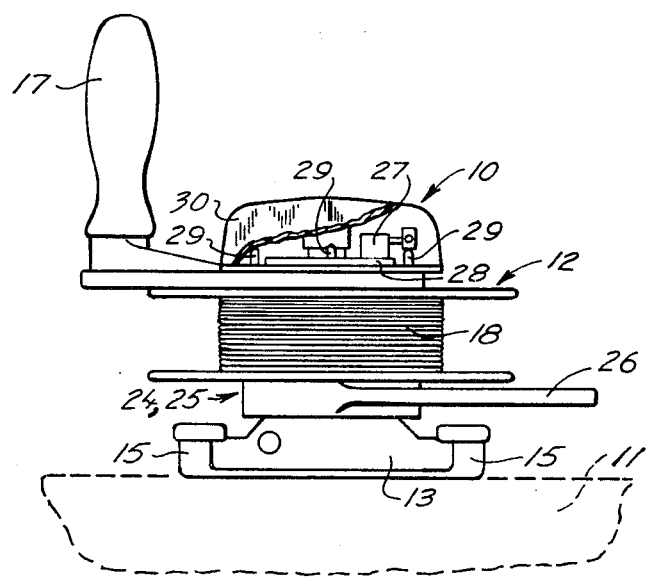
FIG. 2 is a simplified fragmented end elevation of the downrigger.

FIGS. 1 and 2

A downrigger 10 according to the invention has a reel 12 mounted for rotation on the base member 13 which is secured with a releasable clamp means 14 to a convenient portion 11 of a fishing vessel, shown in broken outline, commonly adjacent the gunnel thereof. The clamp means has a pair of spaced parallel guides 15 fixed to the vessel which accept a lower complementary portion of the base member therebetween in a sliding fit. Each guide has a resiliently hinged stepped tang 16 which releasably holds the base member between the guides, permitting easy removal of the downrigger from the guides. A reel handle 17 is secured to the reel and a control line 18 can be wound onto the reel, or unwound from the reel, by rotation of the handle. A guide pulley 20 is swivelably mounted on a guide arm 21 to control direction of the line 18 adjacent the reel during winding on, and unwinding from, the reel. The guide arm 21 is secured in an open-ended bore in the base member 13 and, if desired, can be re-fitted to project from an opposite side, permitting easy adjustment for right or left-handed persons. The downrigger has a brake means 24 having a brake member 25 with a radially disposed brake handle 26 which can be positioned between two extreme positions, namely on and off positions, as will be described. The control line 18 carries a heavy weight and a trolling line release clip means (not shown) at an outer end thereof. The weight, and thus the trolling lure (not shown) can be set to a particular depth, which depth is measured by counting revolutions of the downrigger reel 12. A counter 27 secured to a stationary plate 28 has a star wheel which is turned by projections 29 when the reel rotates, and provides a direct read-out of the revolutions of the reel from which unwound length of control line is known. A transparent cover 30 releasably connected to the plate 28 encloses the counter and associated structure to protect it from impact damage and water dripping onto it and simultaneously permits inspection of the counter 27 during rotation of the reel.

FIGS. 3 through 6

Figure 3:
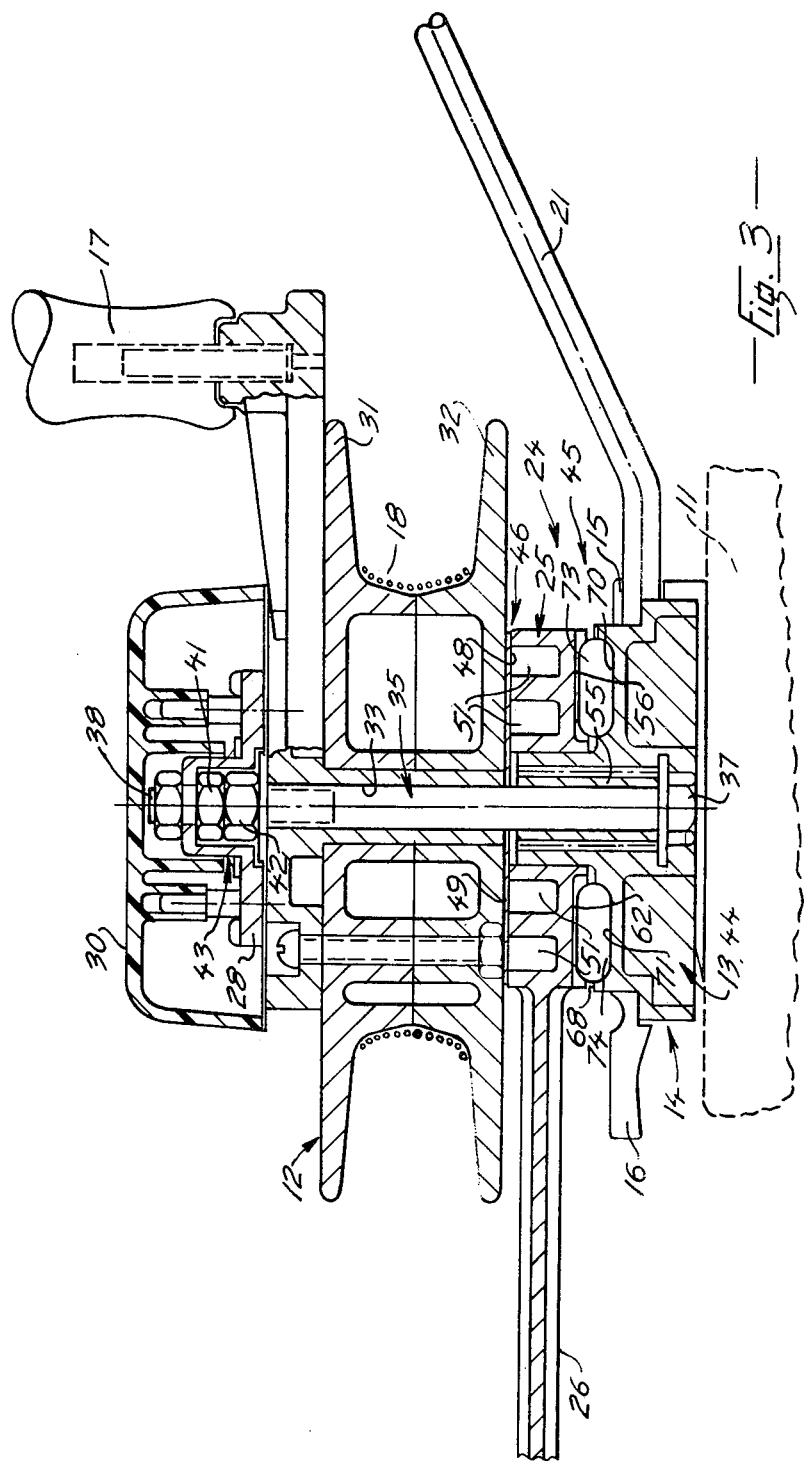
FIG. 3 is a simplified fragmented longitudinal section of the downrigger, plane of the section containing a spindle of the downrigger.

Referring mainly to FIG. 3, the reel 12 has a pair of spaced flanges 31 and 32 to accept the line 18 therebetween and has a central bore 33. A spindle 35 passes through the central bore 33 to mount the reel for rotation about an undesignated axis of the spindle, and also to permit limited axial movement of the reel along the spindle. The spindle is a bolt having a hexagonal head at a lower end 37 which is located in the base member 13 to prevent relative rotation therebetween, and has a threaded upper end 38 carrying a pair of locking nuts 41 and 42 which limit upward movement of the reel and thus serve as a first stop means 43. The base member 13 at the lower end of the spindle serves as a second stop means 44, the brake member 25 being sandwiched between the flange 32 and the base 13. Thus a pair of spaced stop means straddle the reel to limit axial movement of the reel along the spindle. A cam means 45 cooperating with the brake member 25 and the base member 13 carries the reel 12 and is a portion of and actuates the brake means 24 as will be described.

A thin disc 46 is secured to the flange 32 of the reel to rotate therewith and is thus sandwiched between the brake member 25 and the reel 12. The disc 46 has a lower surface 48, termed first braking surface, which can be forced into contact with an upper surface 49 of the brake member 25, termed second braking surface. The disc 46 and brake member 25 are made of two materials which are compatible with each other for braking, for instance the disc 46 can be a polished metal and the brake member 25 can be a suitable plastic or other compound having a high coefficient of friction for braking the disc when forced thereagainst. The braking surfaces 48 and 49 are plane surfaces, however in some applications conical braking surfaces may be more appropriate and thus the braking surfaces should be complementary surfaces of revolution centered on the spindle 35. Thus the disc 46 is a first brake member cooperating with the reel to rotate therewith and has the first braking surface 48 which is a surface of revolution centered on the spindle. The brake member 25 is thus a second brake member cooperating with the cam means 45 and having a second braking surface 49 complementary to the first braking surface and, when the brake means is actuated, is adapted to move axially against the first braking surface to brake the reel. It is noted that the second braking surface 49 has openings 51 therein which are formed from cores when the brake member 25 is injection molded with a suitable plastic. These openings are provided to reduce the volume of plastic required and to reduce "sinkage" problems, and results in a reduced surface area of the brake. It is noted that, even with the reduced surface area of the brake member 25 in contact with the surface 46, adequate braking is obtained. The term "complementary surface of revolution" thus refers to a braking surface which is not necessarily exactly complementary to the disc 46, but can be generally complementary as illustrated. It is to be understood that if the flange 32 is a suitable metal for braking, the disc 46 can be eliminated and thus the flange would be the first brake member, and the lower surface of the flange would be the first braking surface.

Figure 4:
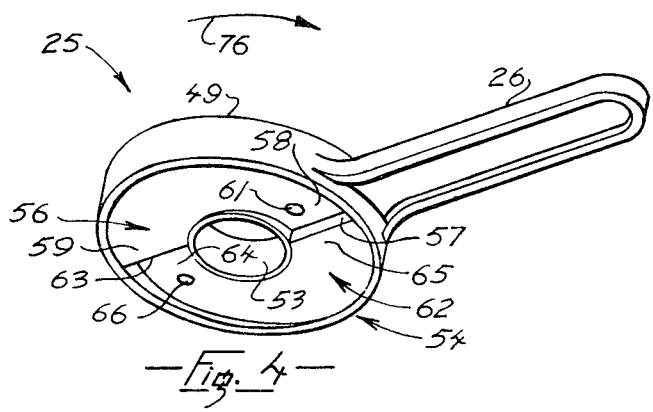
FIG. 4 is a simplified perspective of one portion of a cam means of the invention.
Figure 5:
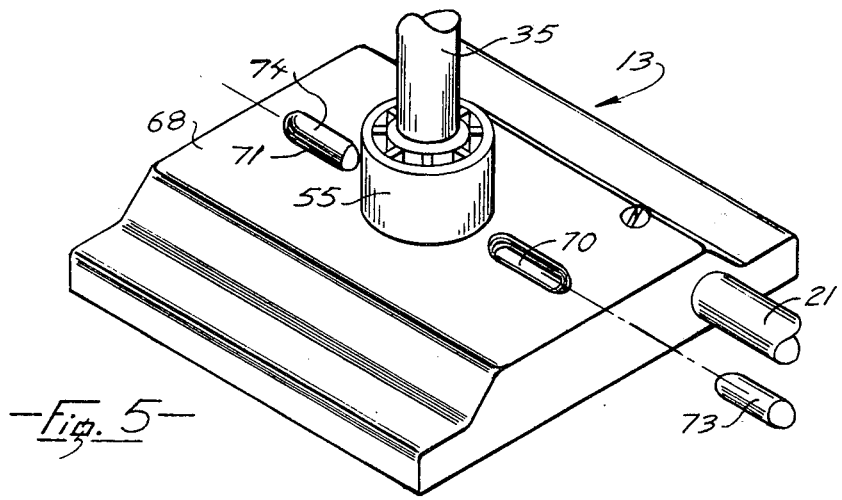
FIG. 5 is a fragmented simplified perspective of a complementary portion of the cam means.

Referring mainly to FIG. 4, the second brake member 25 has the second braking surface 49 on the upper side, a cam surface 54 on an opposite lower side, and a bore 53 to accept a bearing member 55 of the base member 13, see FIG. 5, which is concentric with the spindle 35. A portion of the cam surface 54 is a first helical surface 56 centered on the bore 53 and thus centered on the spindle. The surface 56 sweeps smoothly over one half of a revolution from a first position 58 adjacent to step 57 to a second position 59. A detent 61 protrudes from the surface 56 and is spaced a relatively short distance from the step 57 and serves as a locating means as will be described, and it can be seen that space between the step 57 and detent 61 defines the first position 58. A second helical surface 62 is generally similar to the first surface 56 and sweeps smoothly from a step 63 adjacent a first position 64 to a second position 65 and has a similar detent 66. Thus each helical surface extends over half a revolution and the first surface 56 is diametrically opposed to the second surface 62.

Referring mainly to FIG. 5, the base member 13 has an upper surface 68 having a pair of generally similar diametrically aligned grooves 70 and 71, the grooves having generally semi-cylindrical cross-sections, the groove 70 only being clearly shown. Two generally similar cylindrical rollers 73 and 74 complementary to the grooves are fitted within the grooves so as to roll therein, the roller 74 being shown fitted in the groove 71. When the downrigger is assembled as shown in FIG. 3, the roller 73 is journalled in the groove 70 and contacts the helical surface 56, and the roller 74 is journalled in the groove 71 and contacts the helical surface 62. The member 25 thus is supported on a diameter by a roller contacting as associated helical surface on each side of the spindle.

Figure 6:
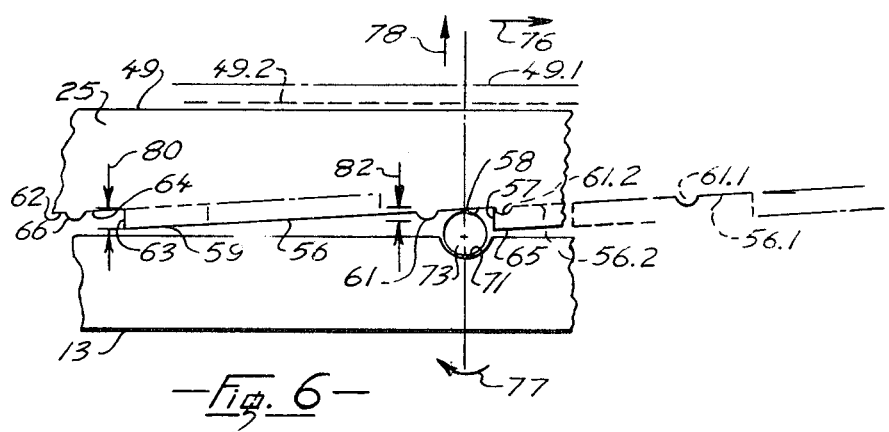
FIG. 6 is a simplified diagram of cooperating complementary portions of the cam means of the downrigger being a plane projection from a semi-cylindrical surface concentric with the cam means.

Actuation of the brake means 25 is described specifically with reference to FIG. 6 which shows in full outline the cooperation of the roller 73 with the surface 56 in the off position. The drawing shows an "unwrapped" view in two dimensions of the helical surface 56, and parallel movements occur with respect to the helical surface 62. To engage the brake, the brake member 25 is rotated in the direction of an arrow 76, which rotates the roller 73 in direction of an arrow 77, the detent 61 passes over the roller to a position 61.1 and the surfaces 49 and 56 move to broken outline positions 49.1 and 56.1 Thus there is a wedge-like action between the roller and helical surface when the brake member 25 rotates, which results in a generally axial movement of the brake member along the spindle. On a diametrically opposite side of the spindle 35, the roller 74 similarly cooperates with the second helical surface 62 which complements the generally axial movement on the opposite side of the brake member to produce a generally symmetrical movement of the brake member along the spindle towards the reel. Clearly, rotation of the brake member in a direction opposite of the arrow 76 produces a movement causing the brake member to move in an opposite direction, thus moving the brake member away from the reel. Thus the rollers 73 and 74 serve as cam followers to roll along the respective helical surfaces 56 and 62 which thus serve as cam surfaces when the cam means is actuated.

Movement of the brake member 25 in direction of the arrow 78 forces the upper surface 49 of the brake member against the reel 12, which is itself forced upward against the locking nuts 41 and 42. The nuts thus serve as one stop means to limit further movement of the reel along the spindle so that continued movement as above actuates the brake means to brake the reel against rotation. Thus the cam means cooperates with the reel to move the reel along the spindle against one stop means and further similar movement fully engages the brake means. The cam surfaces, i.e. the helical surfaces 56 and 62, and the cam followers, i.e. the rollers 73 and 74, respectively cooperate with each other, so that a particular relative movement between the cam surface and the cam follower actuates the cam means to engage the brake means.

Referring particularly to FIG. 6, the brake member 25 and the reel 12 moves along the spindle 35 an amount no greater than height 80 of the step 63 termed "throw" of the helical surface 56, which, for a helical surface having a maximum diameter of about 3 inches is about 3/16 inch. With a tightly adjusted reel, rotation of the brake member 25 through about 90° is sufficient to actuate the brake fully. It is noted that the detent 61 protrudes from the surface 56 an amount 82, about 1/16 inch, which is considerably less than that required to actuate the brake fully. Considering the relative positions shown in full outline, the roller 73 is contacting the first position 58 that is, the roller is between the step 57 and the detent 61. Thus the cam means and therefore the brake member 25 is at its furthest position from the stop means 43 and the reel 12 can rotate freely in either direction, which is the off position of the brake means. It is noted that the weight of the reel 12 and line 18 is carried by the cam means, and the brake surfaces are in contact and thus, when the reel rotates in the direction of the arrow 76, frictional forces between the braking surfaces would tend to rotate the brake member in the same direction. This would cause the cam surface to move across the roller and raise the member 25 to engage the brake. This tendency of the brake member to rotate due to frictional forces only turning the brake member is essentially prevented by the detent 61, which protrudes sufficiently from the surface 56 to prevent the detent passing easily over the roller. Thus the brake surfaces slide over each other and unintentional braking which otherwise might occur when the brake means is in the off position is prevented. The line 18 is arranged on the reel so that when the reel rotates in direction of the arrow 76 it unwinds from the reel.

As previously described, to engage the brake fully or positively, the brake member 25 is rotated by swinging the brake handle 26 in direction of the arrow 76 so that the detent is forcibly passed over the roller and the surface 56 assumes the broken outline position 56.1. This position is attained when a definite resistance to further rotation is felt, which occurs when the brake is fully engaged. When fully engaged the brake can be backed-off or fully disengaged without forcing the detent back over the roller, so that the surface 56 and the detent 61 assume broken outline positions 56.2 and 61.2 in which the roller 73 is intermediate of the detent and the second position 59. When the surface 56 is at 56.2, the roller 73 contacts the surface 56 and the braking surfaces are in frictional engagement and the brake member can rotate in the direction of arrow 76. Thus rotation of the reel in direction of the arrow 76 rotates the brake member 25 also, and causes the roller 73 to roll along the cam surface 56 simultaneously moving the brake member in direction of the arrow 78 tending to brake the reel. Thus the final result is similar to that which occurs when the brake member is moved directly to engage the brake. Note that rotation of the reel in an opposite direction disengages the brake to permit winding in of the line and thus the brake means functions similarly to a unidirectional ratchet mechanism which engages the brake when the reel rotates in one direction and permits free wheeling in the opposite direction. It is noted that, as the roller moves relatively up the surface 56, pressure between the surface and the roller increases, thus reducing chances of slippage and, similar to a wedge-action, the harder the reel is rotated in direction of the arrow 76 causing the roller to approach the second position, the greater is the braking effect. Thus, when the roller is between the detent and the second position it can be seen that the brake is effectively cocked or primed so that if the reel rotates in a particular direction so as to unwind the line, the cam means is actuated which then engages the brake means to brake the reel against rotation in that particular direction. It can be seen that the cocked position is particularly useful when the control line 18 is being wound in to bring up the weight after there has been a strike on the trolling line, as it would permit the handle 17 of the downrigger to be released without resulting in accidental unwinding of the line, and then later, with one hand, bringing up the weight could be resumed.

It is noted that, even when the brake has been engaged positively by moving the brake handle 26, the brake can be disengaged to the cocked position by rotating the reel handle 17, which, by friction rotates the brake means to move it to the cocked position. Note that the detents essentially prevent the brake means being moved to the off position accidentally by the handle 17 as the off position cannot be attained without a positive movement of the handle 26 to move the detents past the rollers. Likewise the detents essentially prevent accidental cocking of the brake by the reel alone moving the brake member from the off position.

OPERATION

In use, the downrigger is mounted adjacent the trolling rod (not shown), the rod being held in a rod holder for convenient operation of the reels of both the trolling rod and the downrigger. Following normal practice the trolling line (not shown) is clipped to the releasable clip (not shown) on the control line 18 and both lines are let out to the desired depth as indicated by the counter on the downrigger reel. Whilst the downrigger reel is unwinding the line 18, the brake means 24 is in the off position permitting free unwinding. When the described depth is obtained, the lever 26 is moved to engage the brake, which, as has been described with reference to FIG. 6, forces the detents over the respective rollers so that the rollers roll along the helical surfaces towards their respective second positions. Alternatively, the weight can drop freely when unwinding the lines from both reels and the speed of descent can be controlled with the brake member 25 which permits easy variation of braking forces by rotating the brake member slightly about a position in which there is initial engagement of the brake. When the desired depth is reached using either method, the brake means is positively engaged by rotating the brake member a little further to engage the brake to ensure that if the handle 26 were accidentaly knocked, the brake would not be released. Followin normal practice, the reel of the trolling rod is wound in to lessen unnecessary slack in the trolling line which reduces the drag from the water friction.

When a fish strikes the lure, the downrigger line jerks and usually the fish pulls the release clip to separate the lines. The fish is then controlled by the trolling line with the downrigger weight hanging freely on the control line 18. After the strike, the reading of the counter 27 is noted so that after the fish has landed or has escaped, the lure can again be set at that desired depth. While the fish is being played, the downrigger weight should be wound up to avoid the fish winding the trolling line around the control line, and possibly to prevent the weight hitting the sea or lake bottom if the boat were to move into shallower water. If fishing alone, after a strike the fish is first brough under control on the trolling line and the downrigger line is then wound up with one hand while holding the trolling rod in the other. Whilst winding up the control line, the brake should be cocked so that, if two hands are suddenly required to control the trolling rod, the handle 17 can be released and the brake means is immediately actuated to prevent unwinding, thus leaving both hands free as long as required for controlling the trolling reel. When two hands are no longer required for the trolling rod, the fisherman can continue winding in the control line which only requires one hand to rotate the downrigger reel as the brake can be automatically released when the reel is rotated for winding in.

Thus, in summary, it can be seen that the brake means has effectively three main positions and of these the cocked position is particularly useful for the lone fisherman who commonly would have only one hand available for controlling the downrigger. When the brake is cocked he can wind in the weight and if necessary release the handle 17 without directly moving the brake lever and this will not result in accidental unwinding of the line 18. The brake means has the two common positions namely the off position and the positively engaged position, which are attained by swinging the handle 26 of the brake means between extreme positions.

It is noted that by providing helical surfaces to engage the brake and rollers, any wear of the main braking components, i.e. the rollers, their grooves and the helical surfaces and braking surfaces can be compensated to some extent by inserting shim washers or, by tightening the nuts 41 and 42, to restrict axial movement of the reel and braking member along the spindle. The rollers are subjected to most wear and, when worn, can be easily and inexpensively replaced.

ALTERNATIVES AND EQUIVALENTS

In an alternative cam means, not illustrated, the cam followers could be carried in the brake member to move therewith and the cam surface would be fixed relative to the base member. In either embodiment, when the brake is cocked, in response to relative movement between the cam and cam follower, the brake member is moved axially to engage the brake. Also the detent protrudes sufficiently from the cam surface to prevent the detent and cam follower from passing each other when only the reel rotates and the brake is in the off position, and when the brake means is cocked the detent and the follower can be forcibly moved past each other. Furthermore, two followers are illustrated but, with modification more or less followers may be used. Also rollers journaled in grooves are shown but alternative followers could be substituted.

I claim:

1. A downrigger for trolling having: a reel adapted for winding a line thereonto and for unwinding a line therefrom; the reel being mounted for rotation about an axis and between a pair of spaced stop means; a brake means to brake the reel against rotation when engaged and to permit free wheeling of the reel when disengaged; and a cam means cooperating with the brake means and having a cam follower and a cam surface, the cam surface being characterized by:
   a. a helical surface centered on the axis, the surface having location means thereon which holds the cam follower either in an off position in which the reel is free to rotate in either direction, or in cocked position in which rotation of the reel resulting from unwinding of the line actuates the cam means to engage the brake means to prevent further unwinding.

2. A downrigger as claimed in claim 1 in which:
   a. the locating means is a detent on the cam surface which protrudes sufficiently from the surface to prevent the detent and cam follower from passing each other when the reel rotates when the brake is in the off position, and when the brake means is to be cocked the detent and cam follower can be forcibly moved past each other.

3. A downrigger as claimed in claim 2 in which:
   a. the cam follower is a roller adapted to roll on the cam surface in response to relative movement between the cam and cam surface during actuation of the cam means.

4. A downrigger as claimed in claim 3 in which the brake means includes:
   a. a first brake member cooperating with the reel to rotate therewith, the first brake member having a first braking surface being a surface of revolution centered on the spindle,
   b. a second brake member cooperating with the cam means and having a second braking surface generally complementary to the first braking surface and adapted to move axially against the first braking surface when the cam means is actuated to brake the reel.

5. A downrigger as claimed in claim 4 further characterized by:
   a. the second brake member having an operating handle and being mounted for limited rotation and axial movement on the spindle and having two opposite sides, one side having the second braking surface, the opposite side having the cam surface,
   b. a base member secured to the spindle serving as a stop means, the base member journalling the roller so that rotation of the second brake member from the off position to engage the brake causes the detent to pass the roller and the cam surface to roll on the roller to move the second brake member towards the reel to force the second braking surface against the first braking surface to brake the reel.

6. A downrigger as claimed in Claim 5 further characterized by:
   a. the cam surface having first and second helical surfaces centered on the spindle, each helical surface extending over half a revolution, the first surface being diametrically opposed to the second surface,
b. the base member having a pair of generally similar diametrically aligned grooves, the grooves having generally semi-cylindrical cross-sections which are complementary to the rollers so as to journal the rollers therein, so that the brake member is supported on a diameter by a roller contacting an associated helical surface on each side of the spindle.

7. A downrigger as claimed in claim 1 in which:
a. the reel has a central bore,
b. a reel spindle is concentric with the axis and passes through the central bore to mount the real for rotation thereon,
c. the stop means cooperate with the spindle to limit axial movement of the reel along the spindle.

8. A downrigger as claimed in claim 7 in which:
a. the cam means is fitted between the reel and a stop means and cooperates with the reel, so that when the cam means is actuated the reel is forced against a stop means to engage the brake means.

9. A downrigger as claimed in claim 8 in which the brake means includes:
a. a first brake member cooperating with the reel to rotate therewith, the first brake member having a first braking surface being surface of revolution centered on the spindle,
b. a second brake member cooperating with the cam means and having a second braking surface generally complementary to the first braking surface and adapted to move axially against the first braking surface when the cam means is actuated to brake the reel.

10. A downrigger as claimed in claim 9 in which:
a. the locating means is a detent on the cam surface which protrudes sufficiently from the surface to prevent the detent and cam follower from passing each other when the reel rotates when the brake is in the off position, and when the brake means is to be cocked the detent and cam follower can be forcibly moved past each other.

11. A downrigger as claimed in claim 10 in which:
a. the cam follower is a roller adapted to roll on the cam surface in response to relative movement between the cam and cam surface during actuation of the cam means.

12. A downrigger as claimed in claim 11 further characterized by:
a. the second brake member having an operating handle and being mounted for limited rotation and axial movement on the spindle and having two opposite sides, one side having the second braking surface, the opposite side having the cam surface,
b. a base member secured to the spindle serving as a stop means, the base member journalling the roller so that rotation of the second brake member from the off position to engage the brake causes the detent to pass the roller and the cam surface to roll on the roller to move the second brake member towards the reel to force the second braking surface against the first braking surface to brake the reel.

13. A downrigger as claimed in claim 12 further characterized by:
a. the cam surface having first and second helical surfaces centered on the spindle, each helical surface extending over half a revolution, the first surface being diametrically opposed to the second surface,
b. the base member having a pair of generally similar diametrically aligned grooves, the grooves having generally semi-cylindrical cross-sections which are complementary to the rollers so as to journal the rollers therein, so that the brake member is supported on a diameter by a roller contacting an associated helical surface on each side of the spindle.

* * * * *

UNITED STATES PATENT AND TRADEMARK OFFICE
CERTIFICATE OF CORRECTION

PATENT NO. : 4,044,968
DATED : 30 August 1977
INVENTOR(S) : Blayney J. Scott

It is certified that error appears in the above-identified patent and that said Letters Patent are hereby corrected as shown below:

In Claim 4, at line 37, after "which" please enter -- the reel is mounted on a spindle concentric with the axis, and in which --.

Signed and Sealed this

Sixth Day of February 1979

[SEAL]

Attest:

RUTH C. MASON
*Attesting Officer*

DONALD W. BANNER
*Commissioner of Patents and Trademarks*